United States Patent [19]

Avery et al.

[11] 4,212,791

[45] Jul. 15, 1980

[54] POLY(ALKYLENETEREPHTHALATE) MOLDING COMPOSITIONS CONTAINING OLIGOMERIC POLYESTER AND SEGMENTED COPOLYESTER-POLYETHER ELASTOMER

[75] Inventors: Noyes L. Avery; William J. Work, both of Oreland, Pa.

[73] Assignee: Rohm and Haas, Philadelphia, Pa.

[21] Appl. No.: 14,405

[22] Filed: Feb. 23, 1979

[51] Int. Cl.$^2$ .................... C08L 67/02; C08L 67/08; C08L 69/00
[52] U.S. Cl. .................... 260/40 R; 525/1; 525/4; 525/67; 525/69; 525/146; 525/174; 525/444
[58] Field of Search .............. 525/444, 1, 4; 260/40 R

[56] References Cited

U.S. PATENT DOCUMENTS

| | | | |
|---|---|---|---|
| 3,565,852 | 2/1971 | Conix et al. | 260/40 |
| 3,652,714 | 3/1972 | Berger | 525/444 |
| 3,864,428 | 2/1975 | Nakamura et al. | 525/310 |
| 3,907,926 | 9/1975 | Brown et al. | 525/444 |
| 3,917,743 | 11/1975 | Schroeder et al. | 525/444 |
| 3,919,353 | 11/1975 | Castelnuovo et al. | 525/69 |
| 3,963,800 | 6/1976 | Gipp et al. | 525/444 |
| 4,011,285 | 3/1977 | Seymour et al. | 525/444 |
| 4,064,098 | 12/1977 | Saitoh et al. | 525/444 |
| 4,081,494 | 3/1978 | Sakai et al. | 260/860 |

*Primary Examiner*—Carman J. Seccuro
*Attorney, Agent, or Firm*—Michael B. Fein

[57] ABSTRACT

Compositions comprising poly(alkylene terephthalate), an inert particulate nucleating agent, an oligomeric polyester crystallization promoter, and a segmented thermoplastic copolyester-ether elastomer are disclosed as having improved crystallization behavior and surface appearance. Methods of increasing the crystallization rate of poly(alkylene terephthalate) are also disclosed.

19 Claims, No Drawings

POLY(ALKYLENETEREPHTHALATE) MOLDING COMPOSITIONS CONTAINING OLIGOMERIC POLYESTER AND SEGMENTED COPOLYESTER-POLYETHER ELASTOMER

BACKGROUND OF THE INVENTION

1. Field of the Invention

This invention relates to improvements to the crystallization and molding behavior of poly(alkylene terephthalate).

2. Description of the Prior Art

The use of inert particulate nucleating agents to promote crystallization of poly(alkylene terephthalate) is very well known. High mold temperatures of at least 120° C. and optimumly 140° C. in the case of poly(ethylene terephthalate) (PET) have generally been necessary for injection molded engineering applications. In the case of PET, because of its low rate of crystallization at desirable molding temperatures of less than 100° C., it has not attained widespread use. When PET is molded with conventional nucleating agents at temperatures below 100° C., they have poor physical properties, dimensional stability and surface appearance due to insufficient crystallization.

Various attempts have been made to improve the crystallization rate of PET. For example, the use of poly(ethylene oxide) or poly(propylene oxide) having hydroxyl functionality has been suggested in combination with nucleating agents; however, this method is undesirable because the PET reacts with the hydroxyl functionality to give a resin with lower molecular weight and poorer physical properties. The use of low molecular weight inert organic solvents such as benzophenone and phthalate plasticizers such as dioctyl phthalate have been suggested, but is not desirable because they cause processing difficulties due to their high volatility under drying or processing conditions for PET, and tend to migrate to the surface of a molded specimen. Solvents such as dibutyl tin dilaurate have been suggested, but these are toxic materials and would be undesirable.

SUMMARY OF THE INVENTION

Compositions comprising poly(alkylene terephthalate) and inert particulate nucleating agent, an oligomeric polyester as crystalization promoter, and a segmented polyester-polyether elastomer have been discovered to cause a unique crystallization enhancement without suffering the problems inherent in the prior art. It is therefore an object of the present invention to provide a composition and method for improving the crystallization characteristics and surface appearance of poly(alkylene terephthalate) while maintaining the physical properties of the poly(alkylene terephthalate). It is a further object of the invention to provide a PET composition displaying a very high crystallization rate. A still further object of the invention is to allow PET to be molded at mold temperatures below 100° C. to obtain highly crystalline parts which display good surface appearance even in thin sections. A still further object of the invention is to provide poly(alkylene terephthalate) molding compositions which do not contain highly volatile solvents which tend to migrate to the surface of moldings.

DETAILED DESCRIPTION OF THE INVENTION AND THE PREFERRED EMBODIMENTS

Although any linear thermoplastic poly(alkylene terephthalate) can be used in the present invention, the preferred thermoplastic polyesters are PET or blends of PET with other thermoplastic polyesters. The invention is also applicable to poly(butylene terephthalate) (PBT), poly(hexylene terephthalate), poly(cyclohexylene terephthalate), poly(cyclohexyl dimethylene terephthalate), and the like, copolyesters such as poly(ethylene/butylene terephthalate), or blends of these materials. Thermoplastic polyesters which comprise structural units derived from terephthalic acid and from up to 5 mole percent of other aromatic or aliphatic dicarboxylic acids such as isophthalic, naphthalene-2,6-dicarboxylic acid or adipic acid are also suitable. The alcohol component of the thermoplastic polyester may be comprised of up to 30 mole percent of one or more other aliphatic diols such as 2,2-dimethylpropane diol and butane diol. The invention is also applicable to polyesters based on hydroxy carboxylic acids. Any two or more of these thermoplastic polyesters can be blended.

The polyesters used as starting compounds should preferably have an intrinsic viscosity range of 0.4 to 1.4 grams per deciliter, and more preferably between about 0.6 and 0.8 grams per deciliter. For these purposes, the intrinsic viscosity is measured before extrusion in a 1% solution of phenol and tetrachloroethane, 60:40 at 25° C.

The inert particulate nucleating agent can be talc, Kaolin, calcium carbonate, aluminum oxide, titanium dioxide, silica, graphite, and the like. Amounts of nucleating agent to be used include 0.05–5%. The nucleating agent can be a mixture of two or more inert particulate materials of which graphite is one.

The oligomeric polyesters which have been found to be useful in this invention have a molecular weight, $M_n$, of about 700 to 10,000 and a Flory Interaction Parameter less than or equal to 0.2 with the poly(alkylene terephthalate), and are derived from organic dicarboxylic acid having 2 to 8 carbon atoms and organic polyol. The preferred molecular weight is about 900 to 5000. Preferably the polyol is a glycol and has 2 to 15 carbon atoms. The oligomeric polyester can be terminated with either a fatty acid or an aliphatic alcohol preferably having 7 to 15 carbon atoms, or it can be unterminated. The oligomeric polyester can also include an aromatic glycol. The hydroxyl number of the oligomeric polyester should be less than 50 mg/g and preferably less than 10 mg/g to prevent degradation of the poly(alkylene terephthalate) during melt processing or long term use at elevated temperatures. One suitable method for preparation of the oligomeric polyester is disclosed by Van-Hook in U.S. Pat. No. 3,284,399. Several particular highly preferred oligomeric polyesters are as follows:

Decyl terminated [ethylene adipate/phthalate (1/1)] 2.0

Isodecyl terminated [ethylene adipate/phthalate (1/2)] 2.7

Octyl/decyl (1/1) terminated [ethylene adipate/phthalate) (1/2)] 2.2

$C_{14}$ fatty acid terminated poly (propylene adipate).

2-ethyl hexyl terminated poly(butylene adipate).

poly[propylene adipate/phthalate (3/1)], $M_w = 1200$.

poly[propylene adipate/isophthalate (3/1)], $M_w = 2000$

The amount of oligomeric polyester which can be used in the compositions are 0.1 to 10%. It is preferred that the oligomeric polyester have a Flory Interaction Parameter less than or equal to 0.2 with the poly(alkylene terephthalate). Other additives are optionally present in the compositions of the invention. Up to 50% mineral fillers, fibrous reinforcement such as glass fibers, flame retardants, colorants, stabilizers, water scavengers, processing aids, and impact modifiers can be included. The impact modifiers used are preferably among the ones disclosed in U.S. patent application Ser. No. 694,509; U.S. Pat. No. 3,864,428; and or U.S. Pat. No. 3,919,353. Furthermore, up to 8% of an aromatic polycarbonate prepared by the reaction of phosgene with 2,2-(4,4'-dihydroxydiphenyl)-propane(bis phenol A) can be included to synergistically improve the impact strength. In accordance with our invention, the use of segmented thermoplastic copolyester-ether elastomers has been found to behave synergistically with the oligomeric polyester to improve surface appearance, crystallization temperature, and rate of crystallization.

The copolyester elastomers are derived from the condensation polymerization of one or more dicarboxylic acids or polymerizable derivatives, one or more long chain glycols, and one or more short chain glycols. The dicarboxylic acids or ester derivatives are primarily aromatic in character, such as terephthalic and isophthalic, although aliphatic acids or ester derivatives such as succinic, glutaric, and azelaic may be incorporated at modes levels. The long chain glycols have a molecular weight of about 400–6000 and are generally poly(alkylene ether) glycols such as poly(ethylene ether) glycol, poly(propylene ether) glycol and preferably poly(tetramethylene ether) glycol. The short chain glycols can be ethylene, propylene, butylene, and the like.

Considerable literature exists describing polyester elastomers that are suitable for use in this invention as well as the standard polymerization techniques used for their preparation, for example, German Pat. No. DT2338-615, Japanese Pat. Nos. 75,160,365 and 75,48,059, and U.S. Pat. Nos. 3,651,014; 3,023,192; 3,763,109; 3,766,146; and 3,954,689. The use of branched polyester elastomers are also useful. The use of polyester elastomers where the long chain ester segments are derived from long chain dicarboxylic acids, rather than poly(alkylene ether) glycol esters, are of interest when resistance to thermal degradation and weathering stability are of importance. Such materials are described in U.S. Pat. No. 3,954,689.

Preferred polyester elastomers are derived from terephthalic acid and derivatives, isophthalic acid and derivatives, 1,4-butanediol, and poly(tetramethylene ether) glycol such that the long chain ester segments comprise 10–90 percent by weight of the total polyester elastomer. The most preferred polyester polyether elastomers are those which contain 50–95% by weight of the long chain ester segments and which are derived from a poly(tetramethylene) ether glycol with a molecular weight of about 1000 grams/mole.

Further enhancement of the surface appearance of the molded composition can be obtained by incorporation of small amounts, preferably about 0.05 to 5% by weight, of high molecular weight polytetrafluoroethylene. High molecular weight polytetrafluoroethylenes suitable for this invention preferably have an $M_n$ greater than 1,000,000 and are prepared by well known methods.

The compositions are blended by tumbling the dry components together and extruding on a single or twin screw extruder. One can also feed these separate components into separate parts of an extruder.

It is surprising that the combination of oligomeric polyester, nucleating agent, and segmented polyester-polyether elastomer copolymer together gives such improvement to the surface appearance and crystallization rate of poly(alkylene terephthalate), especially PET. Polyester-polyether elastomers cause little improvement in the crystallization behavior of PET when used alone, and therefore it is very surprising that they should have such a profound effect when used in combination with an oligomeric polyester and a nucleating agent.

The following examples are presented to illustrate a few embodiments of the invention, but the invention should not be considered to be limited thereto. All parts and percentages are by weight unless otherwise indicated.

EXAMPLES

Measurements of crystallization rates, percentage crystallinity, and crystallization temperature were all performed by differential thermal analysis. Crystallization rates were determined isothermally at 100° C. on quenched samples of molten PET. The rate of crystallization is expressed as crystallization half-time, $t_{1/2}$, which is the time necessary for 50% of the polymer to crystallize. The degree of crystallinity of molded specimens was determined by the difference in area between melting endotherm and recrystallization exotherms according to equation 1:

$$\% \text{ Crystallinity of } PET = \frac{E \times \Delta A \times \Delta T\text{scale} \times T\text{scale}}{\Delta H_f(PET) \times R \times W \times W_f(PET)} \times 100 \quad (1)$$

where E is an instrument correction factor, $\Delta A$ is the difference in areas, $\Delta T$scale is the vertical temperature response, Tscale is the horizontal temperature scale, $\Delta H_f(PET)$ is 27.0 cal/g., R is the heating rate, W is the sample weight and $W_f(PET)$ is the weight fraction of PET in the sample. The crystallization temperature ($T_c$) was determined as the temperature where the recrystallization peak maximum occurred during heating at a 20° C./min. heating rate of a specimen cut from an injection molded sample. Smaller numbers indicate greater efficiency of the additives for improving crystallization behavior. In some case crystallization was complete as molded; in this event, no recrystallization exotherm was observed hence a $T_c$ was not observed.

The surface appearance of the injection molded specimens was determined by measuring the 60° C. Gloss on a 2"×3"×0.125" plaque. The plaque was molded on a Newbury 1.5 oz reciprocating screw injection molding machine. The mold cavity was edge gated with a 0.1"×0.2" gate. The 60° C. Gloss was measured on the four corners and center of both sides of the plaque and averaged to give the recorded values.

The polyester-polyether copolyester elastomers used in this study are recorded in Table 1. The polyester-polyether elastomers are prepared from dimethyl-terephthalate, 1,4-butane diol, and poly(tetramethylene oxide) glycol to give materials with poly(butylene terephthalate) hard segments and poly(tetramethylene ether) soft segments. The poly(tetramethylene ether) has a molecular weight of 1100 g/mole. These polyester polyether elastomers may also contain small amounts (<10%) of isophthalate units.

Table 1

| Designation | Polyester-Polyether Elastomers Approximate Description (weight ratio) | Durometer Hardness | Melting Point (°C.) | Flexural Modulus (psi) |
|---|---|---|---|---|
| A | 4/1 Polyester polyether | 72D | 218 | 75000 |
| B | 3/1 Polyester/polyether | 63D | 205 | 50000 |
| C | 3/2 Polyester/polyether | 55D | 211 | 30000 |
| D | 1/2 Polyester/polyesther | 40D | 168 | 7000 |

EXAMPLE 1

Poly(ethylene terephthalate) (70 parts), with an intrinsic viscosity of 0.62 g/dl as measured in a 1% solution of 3:2 phenol:tetrachloroethane at 25° C., and 30 parts of 3/16" chopped glass fiber strand were dried under vacuum for 12 hours. The materials were mixed together and extruded in a 1" single screw extruder equipped with one vacuum vent and a nitrogen blanketed feed. The extrudate was pelletized and dried again under vacuum for 6 hours at 120° C. The material was molded on a Newbury 1.5 oz reciprocating screw injection molding machine at 275° C. melt temperature, a 95–100° C. mold surface temperature, and a 40 second cycle time.

EXAMPLES 2–13

Examples 2–13 were compounded and molded in the same fashion as Example 1 except that polyester-polyether elastomer C, oligomeric polyester octyl/decyl (1/1 molar) terminated [ethylene adipate/phthalate (1/2)]2.2, and a core-shell impact modifier "A", consisting of a crosslinked poly(butyl acrylate) core on which was grafted poly(methyl methacrylate), were substituted for some of the poly(ethylene terephthalate). All samples contained 30 parts glass fiber and 0.4 parts talc. The total amount of poly(ethylene terephthalate), polyesterpolyether elastomer, oligomeric polyester, and core-shell impact modifier was equal to 70 parts. The amounts of the additives in the compositions and the surface appearance, crystallization behavior, and tensile data are summarized in Table 2.

The data in Table 2 demonstrate the necessity of including both a polyester-polyether elastomer and an oligomeric polyester in the composition to obtain a good surface appearance, a low $T_c$, and a high degree of crystallinity. Thus, Example 1, 30% glass fiber reinforced PET, shows a low gloss, high $T_c$, and low degree of crystallinity. When only the core-shell impact modifier is added, as in Example 2, the gloss increases slightly as does $T_c$; the tensile strength is greatly reduced. Examples 3 and 4 show that adding the oligomeric polyester to the composition of Example 2 results in some improvement gloss, $T_c$, and crystallinity with some decrease in tensile strength. Example 5 shows that there is a decrease in $T_c$ and an increase in the degree of crystallinity with a small improvement in gloss when only the oligomeric polyester is added to the composition of Example 1. Example 6 shows that replacing half of the core-shell impact modifier in Example 2 with the polyester-polyether elastomer C gives a composition with increased gloss, a lower $T_c$, a lower degree of crystallinity, and a higher tensile strength. Examples 7 and 8 show that adding both the polyester-polyether elastomer C and oligomeric polyester to the composition of Example 1 increases the gloss to a greater extent than additive effects of each component. In addition, the $T_c$ and degree of crystallinity of Examples 7 and 8 show improvements over Examples 5 and 6. Therefore, only compositions which contain both additives display a high gloss and crystallinity and low $T_c$. Examples 9–13 further demonstrate the utility of this invention in the presence of core-shell impact modifier. When either the amount of polyester-polyether elastomer C or oligomeric polyester are increased, the gloss increases and $T_c$ decreases to a greater extent than is observed when only one of the additives is used.

Table 2

| Ex. No. | Parts Polyester Polyether Elastomer C | Parts Oligomeric Polyester | Parts Core-Shell Impact Modifier | 60° Gloss (% Reflectance) | $T_c$ (°C.) | % Crystalline | Tensile Strength (psi) |
|---|---|---|---|---|---|---|---|
| 1 | 0 | 0 | 0 | 5 | 134 | 30 | 20,925 |
| 2 | 0 | 0 | 21 | 7 | 136 | 35 | 14,300 |
| 3 | 0 | 2 | 21 | 16 | 126 | 37 | 14,000 |
| 4 | 0 | 5 | 21 | 24 | 120 | 39 | 14,400 |
| 5 | 0 | 3 | 0 | 13 | 122 | 38 | 21,154 |
| 6 | 10 | 0 | 10 | 30 | 128 | 25 | 15,840 |
| 7 | 5 | 3 | 0 | 22 | 113 | 41 | 19,683 |
| 8 | 10 | 3 | 0 | 44 | 115 | 41 | 17,762 |
| 9 | 9 | 2.3 | 9 | 42 | 115 | 41 | 15,981 |
| 10 | 9 | 4 | 9 | 48 | 111 | 47 | 15,984 |
| 11 | 9 | 5.7 | 9 | 56 | 109 | 43 | 15,251 |
| 12 | 5 | 4 | 12 | 32 | N.O.* | 47 | 15,100 |
| 13 | 15 | 4 | 9 | 65 | N.O.* | 45 | 14,100 |

*Not observed, sample crystallized completely during injection molding.

EXAMPLES 14–18

The compositions of Examples 14–18 were prepared in the same fashion as Example 1. The compositions consist of 46.85 parts poly(ethylene terephthalate), 30 parts glass fiber reinforcements, 9 parts core shell impact modifier "A", 4 parts oligomeric polyester octyl/decyl terminated [ethylene adipate/phthalate (1/2)]2.2, 0.4 parts talc, 0.5 parts antioxidant, 0.25 poly(tetrafluoroethylene) lubricant, and 9 parts of the additives given in Table 3.

The results summarized in Table 3 show that the glossing effect of the polyester-polyether elastomers is not a property of all polyester-polyether elastomers. Poly(butylene terephthalate) is given as an example of a polyester-polyether elastomer in which 100% of the molecule is polyester. The results in Table 3 demonstrate that the polyester-polyether elastomers which contain 50-90% polyester segments produce compositions with the best surface appearance. An additional advantage of those polyester-polyether elastomers containing high levels of polyester segments is the improved tensile strength of the resulting compositions.

TABLE 3

| Example No. | Type Additive Type Additive | −60° gloss (% Reflectance) | Tensile Strength (psi) |
|---|---|---|---|
| 14 | Poly (butylene terephthalate) | 18 | 17,200 |
| 15 | Polyester-Polyether "A" | 62 | 17,000 |
| 16 | Polyester-Polyether "B" | 56 | 16,000 |
| 17 | Polyester-Polyether "C" | 64 | 15,000 |
| 18 | Polyester-Polyether "D" | 26 | 13,800 |

EXAMPLES 19–22

Examples 19–22 were prepared according to Example 1 with 30 parts glass fiber, 4 parts oligomeric polyester octyl/decyl (1/1) terminated [ethylene adipate/phthalate (1/2)]2.2, 0.4 parts talc, 0.5 parts antioxidant, and the remaining additives present in the amounts shown in Table 4. Poly(ethylene terephthalate) was added in an amount such that its sum with all of the additives and glass fiber totaled 100 parts.

The results in Table 4 demonstrate that further enhancement of the surface appearance of glass-reinforced poly(ethylene terephthalate) compositions containing polyester-polyether elastomers and oligomeric polyesters is possible when small amounts of high molecular weight poly(tetrafluoroethylene) (PTFE) are included in the composition.

Table 4

| Ex. No. | Parts PTFE | Parts Polyester-Polyether Elastomer "A" | Parts Polyester-Polyether Elastomer "C" | Parts Core-Shell Impact Modifier "A" | 60° Gloss (% Reflectance) | % Crystalline |
|---|---|---|---|---|---|---|
| 19 | 0 | 10 | 0 | 9 | 37 | |
| 20 | 0.5 | 9 | 0 | 9 | 73 | |
| 21 | 0. | 0 | 5 | 11.2 | 32 | 46 |
| 22 | 0.5 | 0 | 5 | 11.1 | 48 | 43 |

EXAMPLES 23–45

Examples 23–45 were prepared according to Example 1 with 30 parts 3/16" chopped strand glass fiber, 9 parts core-shell impact modifier A, 9 or 10 parts polyester-polyether elastomer "A" or "C" (designated in Table 6), 0.4 parts talc, 0.5 parts antioxidant, and the amounts of oligomeric polyester or plasticizer and high molecular weight poly(tetrafluoro ethylene) given in Table 6. The amount of poly(ethylene terephthalate) was adjusted so that its sum with the additives and glass fiber totaled 100 parts. The identity of the oligomeric polyesters is given in Table 5. The samples were molded at a mold surface temperature of 90° C.

The data recorded in Table 6 demonstrates that a wide variety of plasticizers and oligomeric polyesters will act to enhance the surface appearance of glass fiber reinforced poly(ethylene terephthalate) when used in conjunction with polyester-polyether elastomers or polyester-polyethers elastomers and high molecular weight poly(tetrafluoroethylene).

Table 5

| | | Molecular Weight (g/mole) |
|---|---|---|
| Designation | Description | |
| I | octyl/decyl (1/1) terminated [ethylene adipate/phthalate (1/2)]2.2 | 800 |
| II | isodecyl terminated [ethylene adipate/phthalate (1/2)] | 1000 |
| III | poly[propylene adipate/phthalate (3/1)] | 2000 |
| IV | poly[propylene adipate/isophthalate (3/1)] | 2000 |
| V | Ethylene bis(2 dioctyl trimellitate) | 900 |
| VI | Ethylene bis(2-ethylhexyl terephthalate) | 500 |
| VII | Fatty acid terminated poly(propylene adipate) | 4000 |
| VIII | 2-Ethylhexyl terminated poly(propylene adipate) | 1100 |
| IX | Fatty acid terminated poly(propylene adipate) | 2000 |
| X | 2-Ethylhexyl terminated poly(propylene adipate) | 2000 |
| XI | Poly(1,3-butylene adipate) | 5100 |
| XII | Epoxidized soybean oil | 900 |
| XIII | Poly(propylene adipate) unterminated | 7000 |
| XIV | Fatty acid terminated poly-(butylene adipate) | 3500 |
| XV | Poly(butylene adipate) alcohol terminated | 3500 |
| XVI | Dioctyl phthalate | 390 |

Table 6

| Ex. No. | Type Oligomeric Polyester | Parts Oligomeric Polyester | Parts and Type Polyester Polyether | Parts PTFE | 60° Gloss (% Reflectance) |
|---|---|---|---|---|---|
| 23 | I | 5 | 9 phr C | 0 | 44 |
| 24 | II | 5 | 9 phr C | 0 | 57 |
| 25 | III | 5 | 9 phr C | 0 | 44 |
| 26 | IV | 5 | 9 phr C | 0 | 56 |
| 27 | V | 5 | 9 phr C | 0 | 25 |
| 28 | VI | 5 | 9 phr C | 0 | 42 |
| 29 | VII | 5 | 9 phr C | 0 | 46 |
| 30 | I | 4.25 | 10 phr A | 0.5 | 75 |
| 31 | II | 4.25 | 10 phr A | 0.5 | 79 |
| 32 | III | 4.25 | 10 phr A | 0.5 | 74 |
| 33 | IV | 4.25 | 10 phr A | 0.5 | 81 |
| 34 | V | 4.25 | 10 phr A | 0.5 | 62 |
| 35 | VI | 4.25 | 10 phr A | 0.5 | 66 |
| 36 | VII | 4.25 | 10 phr A | 0.5 | 69 |
| 37 | VIII | 4.25 | 10 phr A | 0.5 | 63 |
| 38 | IX | 4.25 | 10 phr A | 0.5 | 73 |
| 39 | X | 4.25 | 10 phr A | 0.5 | 70 |
| 40 | XI | 4.25 | 10 phr A | 0.5 | 73 |
| 41 | XII | 4.25 | 10 phr A | 0.5 | 59 |
| 42 | XIII | 4.25 | 10 phr A | 0.5 | 53 |
| 43 | XIV | 4.25 | 10 phr A | 0.5 | 67 |
| 44 | XV | 4.25 | 10 phr A | 0.5 | 63 |
| 45 | XVI | 4.25 | 10 phr A | 0.5 | 47 |

EXAMPLE 46

A composition prepared according to Example 1 with 46.4 parts poly(ethylene terephthalate), 30 parts 3/16" chopped strand glass fiber, 20.1 parts core-shell impact modifier A, 3 parts oligomeric polyester octyl/decyl (1/1) terminated [ethylene adipate/phthalate (1/2)]2.2, 0.5 parts graphite and 0.5 parts talc. Extruded pellets were collected and dried for crystallization half time, $t_{1/2}$, determination at various temperatures.

EXAMPLE 47

A composition prepared according to Example 1 with 47.6 parts poly(ethylene terephthalate), 30 parts 3/16" chopped strand glass fiber, 11.9 parts core-shell impact modifier A, 5 parts polyester-polyether elastomer A, 0.4 parts talc, 1 part graphite, 4 parts octyl/decyl (1/1) terminated [ethylene adipate/phthalate (1/2)]2.2, and 0.1 parts antioxidant. Extruded pellets were collected and dried for crystallization half time, $t_{1/2}$ determinations at various temperatures.

The $t_{1/2}$ values for the compositions of Examples 46 and 47 are in Table 7. These results show that for similar compositions, those which contain 5 parts polyester-polyether elastomer A crystallize about 5 times faster than those which do not.

Table 7

| Ex. No. | Parts Oligomeric Polyester | Parts Polyester Polyether Elastomer A | $t_{\frac{1}{2}}$ (min) measured at | | |
|---|---|---|---|---|---|
| | | | 90° C. | 100° C. | 110° C. |
| 46 | 3 | 0 | 110 | 18 | 3.3 |
| 47 | 4 | 5 | 21 | 3.8 | 1.4 |

We claim:

1. Composition comprising poly(alkylene terephthalate) and an inert, particulate nucleating agent, an oligomeric polyester, and a segmented polyester-polyether block copolymer as crystallization promoters.

2. Composition of claim 1 wherein said poly(alkylene terephthalate) is selected from the group consisting of poly(ethylene terephthalate), poly(propylene terephthalate), poly(butylene terephthalate), poly(hexylene terephthalate), poly(cyclohexylene terephthalate), and poly(cyclohexylene dimethyl terephthalate), and mixtures thereof.

3. Composition of claim 1 wherein said poly(alkylene terephthalate) is poly(ethylene terephthalate) having an intrinsic viscosity of about 0.4 to 1.4 grams/deciliter.

4. Composition of claim 3 wherein said intrinsic viscosity is about 0.6 to 0.8.

5. Composition of claim 1 wherein said inert, particulate nucleating agent is selected from the group consisting of talc, kaolin, calcium carbonate, aluminum oxide, titanium dioxide, silica, and graphite.

6. Composition of claim 5 wherein said nucleating agent is a mixture of two nucleating agents, one of which is graphite.

7. Composition of claim 1 wherein the oligomeric polyester is about 0.1 to 10% by weight, the nucleating agent is about 0.1 to 10% by weight, and the segmented polyester-polyether block copolymer is about 1 to 50% by weight.

8. Composition of claim 1 further including a core-/shell impact modifier.

9. Composition of claim 1 further including bisphenol A polycarbonate.

10. Composition of claim 1 wherein said oligomeric polyester is derived from dicarboxylic acid, aliphatic glycol, and has a molecular weight, $M_n$, of about 700 to 10,000.

11. Composition of claim 10 wherein said oligomeric polyester is derived from a saturated aliphatic alcohol having 7 to 15 carbon atoms, an organic dicarboxylic acid having 4 to 14 carbon atoms, and a glycol having 2 to 6 carbon atoms.

12. Composition of claim 11 wherein said oligomeric polyester is octyl/decyl (1/1) terminated [ethylene adipate/phthalate (1/2)] 2.2.

13. Composition of claim 12 wherein the oligomeric polyester is isodecyl terminated [ethylene adipate/phthalate (1/2)]2.7.

14. Composition of claim 10 wherein said oligomeric polyester is fatty acid terminated or alcohol terminated.

15. Composition of claim 10 derived from dicarboxylic acid, aliphatic glycol, and aromatic glycol.

16. Composition of claim 1 wherein said segmented polyester-polyether block elastomer copolymer is the polymerization product of aromatic dicarboxylic acid, aliphatic diol, and polyalkylene oxide glycol.

17. Composition of claim 16 wherein said elastomer is prepared from dimethyl terephthalate, 1,4-butanediol, and poly(tetramethylene ether) glycol having a molecular weight Mw of about 600–2000.

18. Composition of claim 1 wherein said elastomer consists of about 50 to 90% long ester segments and the balance being poly(tetramethylene ether) glycol with molecular weight of 500 to 1500.

19. Composition of claim 1 further including high molecular weight polytetrafluoroethylene.

* * * * *